Patented July 23, 1929.

1,721,820

UNITED STATES PATENT OFFICE.

KIKUNAE IKEDA, OF TOKYO, JAPAN.

PROCESS OF UTILIZING WASTE WATERS FROM BEET-ROOT-SUGAR MOLASSES.

No Drawing.   Application filed December 17, 1927.   Serial No. 240,933.

This invention relates to a new and improved process of utilizing waste water from beet root sugar molasses after the partial or complete removal of the sugar, and it has for its object to secure valuable products therefrom particularly, glutamic acid and betaine.

The raw material which is worked by the process of the present invention is the concentrated waste water from beet root sugar molasses after partial or complete removal of sugar either by precipitation as alkaline earth saccharate or by fermentation. In such concentrated waste water, much potash, betaine, glutamic acid, and some other organic acids have been found by various investigators and a number of methods have been proposed to obtain one or more of these constituents. The object of the present invention is to obtain these products by a new systematic process which can be carried out economically on a commercial scale.

The process is characterized by the use of sulphuric acid in the separation of potash as well as in the later treatment of the material. It is carried out in the following three stages.

*The first stage: Separation of potash as sulphate.*

To the concentrated waste water, sulphuric acid is added in such a quantity as is sufficient to combine with all the inorganic bases present so as to form normal sulphates of these bases and to combine with a part of betaine. In this way the formation of easily soluble acid sulphate of potash is avoided. The solubility of normal potassium sulphate being not large at ordinary temperature, it separates out as fine crystals and can be removed by filtration. Some sodium sulphate accompanies potassium sulphate in these crystals.

*The second stage: Hydrolysis and separation of glutamic acid.*

To the filtrate from potassium sulphate, a further quantity of sulphuric acid is added and the mixture is heated for some time. The temperature and duration of heating vary with the strength of the acid. The temperature may lie between 80° C. and 180° C. and the duration may vary from a fraction of an hour to several days. The object of this treatment is to produce glutamic acid from a mother substance by a process of hydrolysis. The mother substance exists in all probability in the form of pyrrolidon-carboxylic acid, but some other substances might be present which produce glutamic acid on hydrolysis. The progress of the hydrolysis can be readily followed by measuring the increase of the amount of amino-nitrogen.

After the heating has been kept up long enough, the liquid is filtered if much carbonaceous or humus-like matter is produced. The liquid is then cooled down and slaked lime or powdered limestone is added so as to precipitate the greater part of sulphuric acid added in the form of gypsum. This operation should be carried out in such a manner as to avoid too great a rise of temperature lest glutamic acid be reconverted into pyrrolidon-carboxylic acid in a rather weak acid solution. The liquid which contains much free organic acids, is filtered from gypsum and allowed to stand several days. Glutamic acid separates out gradually in fine crystals and can be collected by filtration.

When it is not required to separate potassium sulphate in a concentrated form, these two stages may be combined into one. Sufficient quantity of sulphuric acid is added to the concentrated waste water and heated long enough to complete the hydrolysis. After cooling, suitable quantity of lime is added to the liquid. In this way, a mixture of potassium sulphate and gypsum is produced and is removed by filtration. The filtrate is treated in the same manner as described above to obtain glutamic acid.

*The third stage: Separation of betaine and utilization of the remainder.*

The filtrate from glutamic acid yields betaine as acid oxalate or hydrochloride when it is treated with a suitable quantity of oxalic or hydrochloric acid. Betaine acid oxalate $C_2O_4H.C_5H_{12}NO_2$ is somewhat difficultly soluble in water and readily precipitates in fine crystals. By treating acid oxalate with lime and water, free betaine can be obtained in aqueous solution.

The mother liquor from acid oxalate of betaine contains some sulphuric and oxyalic acid from which it can be freed by suitable addition of lime, because these acids are precipitated as gypsum and calcium oxylate.

*An example of the process.*—To one kilogram of the waste water from Steffen process, which has been almost completely deprived of sugar by fermentation and condensed to 40° Baumé by evaporation, is added 400 c. c. of sulphuric acid of specific gravity 1.286 at 20° C. Potassium sulphate mixed with some sodium sulphate is precipitated. After heating for some time and then cooling, the precipitated crystals were collected on a filter and washed with a little water, the washing being added to the filtrate. The collected salts weighed 320 grams on drying.

To the filtrate from the foregoing operation, 600 c. c. of sulphuric acid of the same specific gravity as above was added, and the mixture heated to 105°–109° C. for four hours. The solution was then cooled down to 20° C. and 230 grams of slaked lime was added under constant agitation. The rise of temperature during this operation was avoided by carrying it out slowly and by surrounding with cold water the vessel in which the reaction took place. Gypsum produced was removed by filtration and it was washed with 300 c. c. of water. Discoloured gypsum obtained in this way weighed 500 grams on drying.

The filtrate from gypsum to which the washing was added, was inoculated with a small quantity of glutamic acid crystals and allowed to stand four days with occasional stirring. Glutamic acid precipitated as fine crystals were collected, washed and dried. It weighed 57 grams and had the purity of 93%.

The filtrate from glutamic acid crystals was concentrated by evaporation and some hydrochloric acid was added. After a day a crop of crystals of betaine hydrochloride was obtained and weighed 80 grams.

Claims.

1. In a process of manufacturing glutamic acid from waste water from beet root sugar molasses from which the sugar has been partially or wholly removed, the steps which comprise adding sulphuric acid to precipitate potassium sulphate, removing said potassium sulphate, adding more sulphuric acid to the mother liquor, heating the mixture thus obtained, removing the greater part of the sulphuric acid in the form of gypsum and crystallizing glutamic acid out of the filtrate from the gypsum.

2. In a process of manufacturing glutamic acid from waste water of beet root sugar molasses from which the sugar has been wholly or partially removed, the steps which comprise adding sulphuric acid to the waste water, heating the mixture thus obtained, permitting the mass to cool, adding lime to the mixture in such quantities to precipitate a portion of sulphuric acid as potassium sulphate and substantially the remainder as gypsum, removing said precipitates and crystallizing glutamic acid from the mother liquor.

3. A process of producing valuable products from waste water of beet root sugar molasses from which the sugar has been partially or wholly removed, which comprises treating said waste water with sulphuric acid at an elevated temperature, permitting the mass to cool, adding lime to remove the greater part of the sulphuric acid in the form of calcium sulphate and potassium sulphate, crystallizing glutamic acid from the remaining solution, removing said glutamic acid therefrom, and obtaining betaine in the form of a salt from the solution.

4. A process of producing valuable products from waste water of beet root sugar molasses from which the sugar has been partially or wholly removed, which comprises treating said waste water with sulphuric acid at an elevated temperature, permitting the mass to cool, adding lime to remove the greater part of the sulphuric acid in the form of potassium sulphate and calcium sulphate, crystallizing glutamic acid from the remaining solution, removing said glutamic acid therefrom, acidifying the solution remaining to precipitate betaine in the form of a difficultly-soluble salt.

5. A process of producing valuable products from waste water of beet root sugar molasses from which the sugar has been partially or wholly removed, which comprises treating said waste water with sulphuric acid at an elevated temperature, permitting the mass to cool, adding lime to remove the greater part of the sulphuric acid in the form of potassium sulphate and calcium sulphate, crystallizing glutamic acid from the remaining solution, removing said glutamic acid therefrom, adding an inorganic acid to the solution remaining and obtaining betaine in the form of a difficultly-soluble salt therefrom.

6. A process of producing valuable products from waste water of beet root sugar molasses from which the sugar has been partially or wholly removed, which comprises treating said waste water with sulphuric acid at an elevated temperature, permitting the mass to cool, adding lime to remove the greater part of the sulphuric acid in the form of potassium sulphate and calcium sulphate, crystallizing glutamic acid from the remaining solution, removing said glutamic acid therefrom, adding hydrochloric acid to the solution remaining and removing betaine therefrom in the form of betaine hydrochloride.

7. A process of producing valuable products from waste water of beet root sugar molasses from which the sugar has been partially or wholly removed, which comprises treating said waste water with sulphuric acid, removing a portion of sulphuric acid as alkali metal sulphate, adding more sulphuric acid, heating the mixture thus obtained, thereafter adding lime to remove substantially all the sulphuric acid remaining, in the form of gypsum, crystallizing glutamic acid from the solution, adding an acid to the remaining liquor to precipitate betaine in the form of a difficultly-soluble salt therefrom.

8. A process of producing valuble products from waste water of beet root sugar molasses from which the sugar has been partially or wholly removed, which comprises treating said waste water with sulphuric acid, removing a portion of sulphuric acid as alkali-metal sulphate, adding more sulphuric acid, heating the mixture thus obtained, thereafter adding lime to remove substantially all the sulphuric acid remaining in the form of sypsum, crystallizing glutamic acid from the solution, adding hydrochloric acid to obtain betaine hydrochloride therefrom in crystalline form.

9. In a process of manufacturing glutamic acid and betaine from waste water of beet-root-sugar molasses from which the sugar has been wholly or partially removed, the steps which comprise adding sulphuric acid to the waste water to convert the salts of inorganic bases into normal sulphates, heating the mixture thus obtained to hydrolyze the organic compounds, capable of forming glutamic acid, into glutamic acid, adding lime to the mass thus obtained to precipitate the sulphuric acid in the form of gypsum, removing the gypsum and crystallizing glutamic acid from the mother liquor, removing the glutamic acid thus obtained, and acidifying the remaining solution to precipitate betaine in the form of a difficultly-soluble salt.

10. In a process of manufacturing glutamic acid and betaine from waste water of beet-root-sugar molasses from which the sugar has been wholly or partially removed, the steps which comprise adding sulphuric acid to the waste water to convert the salts of inorganic bases into normal sulphates, heating the mixture thus obtained to hydrolyze the organic compounds, capable of forming glutamic acid, into glutamic acid, adding lime to the mass thus obtained to precipitate the sulphuric acid in the form of gypsum, removing the gypsum and crystallizing glutamic acid from the mother liquor, removing the glutamic acid thus obtained, and adding hydrochloric acid to the remaining solution to obtain betaine in the form of crystalline betaine hydrochloride.

In testimony whereof I affix my signature.

KIKUNAE IKEDA.